US011226887B1

(12) United States Patent
Sharifi Mehr

(10) Patent No.: US 11,226,887 B1
(45) Date of Patent: Jan. 18, 2022

(54) USER CODE DEPLOYMENT ACROSS COMPUTE RESOURCE PARTITIONS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 403 days.

(21) Appl. No.: 15/371,054

(22) Filed: Dec. 6, 2016

(51) Int. Cl.
*G06F 9/44* (2018.01)
*G06F 11/36* (2006.01)
*H04L 29/08* (2006.01)
*H04L 12/24* (2006.01)
*G06F 8/60* (2018.01)
*G06F 9/50* (2006.01)

(52) U.S. Cl.
CPC ............ *G06F 11/3612* (2013.01); *G06F 8/60* (2013.01); *G06F 9/5061* (2013.01); *H04L 41/14* (2013.01); *H04L 67/34* (2013.01); *H04L 67/10* (2013.01)

(58) Field of Classification Search
CPC .................................................. G06F 11/3612
USPC ......................................................... 717/127
See application file for complete search history.

(56) References Cited

U.S. PATENT DOCUMENTS

| 5,421,687 | A * | 6/1995 | Wayman | ............... B60P 1/6436 414/339 |
| 8,346,934 | B2 * | 1/2013 | Okamoto | ............. G06F 9/4856 370/221 |
| 9,742,841 | B2 * | 8/2017 | Imamura | ............... G06F 9/4856 |
| 10,200,261 | B2 * | 2/2019 | Cuervo Laffaye | .... G06F 9/5044 |
| 2008/0133558 | A1 * | 6/2008 | Carlson | ..................... G06F 8/36 |
| 2014/0007097 | A1 * | 1/2014 | Chin | ................... G06F 9/45533 718/1 |
| 2014/0053150 | A1 * | 2/2014 | Barnett | ............... G06F 9/45558 718/1 |
| 2015/0234675 | A1 * | 8/2015 | Steiss | ........................ G06F 9/46 718/100 |
| 2016/0241565 | A1 * | 8/2016 | Greene | ............ G06Q 10/06398 |
| 2017/0177860 | A1 * | 6/2017 | Suarez | .................... G06F 21/53 |
| 2017/0286673 | A1 * | 10/2017 | Lukacs | ................. G06F 21/554 |

* cited by examiner

*Primary Examiner* — Evral E Bodden
(74) *Attorney, Agent, or Firm* — Knobbe, Martens, Olson & Bear, LLP

(57) ABSTRACT

Systems for processing requests to execute a program code of a user use a deployment model to select one of multiple virtual computing environments, each implemented on a plurality of server computers, which will produce the optimal program code execution, according to metrics such as latency, cost, and resource availability. The system receives the requests in the form of event messages associated with triggering events occurring on networks across the environments. The system feeds network usage data and event message metadata describing the event, event source, other target resources, and the like, into the deployment model to identify a candidate environment. The system enables the candidate environment to execute the program code, and then routes a subset of the event messages to the candidate environment, monitoring associated performance data. If the request processing is improved, the system continues routing some or all of the event messages to the candidate environment.

20 Claims, 6 Drawing Sheets

USER CODE DEPLOYMENT ACROSS COMPUTE RESOURCE PARTITIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device can create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines can themselves be partitioned into multiple isolated virtual systems, called "containers." The virtual machine controls allocation of resources such as processing power and memory, and each container has its own process and network space in which the container can, for example, execute software programs.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private cloud. Computing environments that share a platform can be physically and/or logically isolated from each other to prevent or control data transmissions between the environments. Physical isolation may include, for example, eliminating network communication between servers of different computing environments. Logical isolation can be achieved in many ways, such as by placing a computing environment's network access onto a private subnet and/or virtual private network, or by requiring user authentication to access any interfaces with the computing environment. Thus, a process running in a container on a virtual machine in a virtual private cloud allocated in one computing environment may be unable to access a resource stored in another computing environment, or may encounter high latency when doing so.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
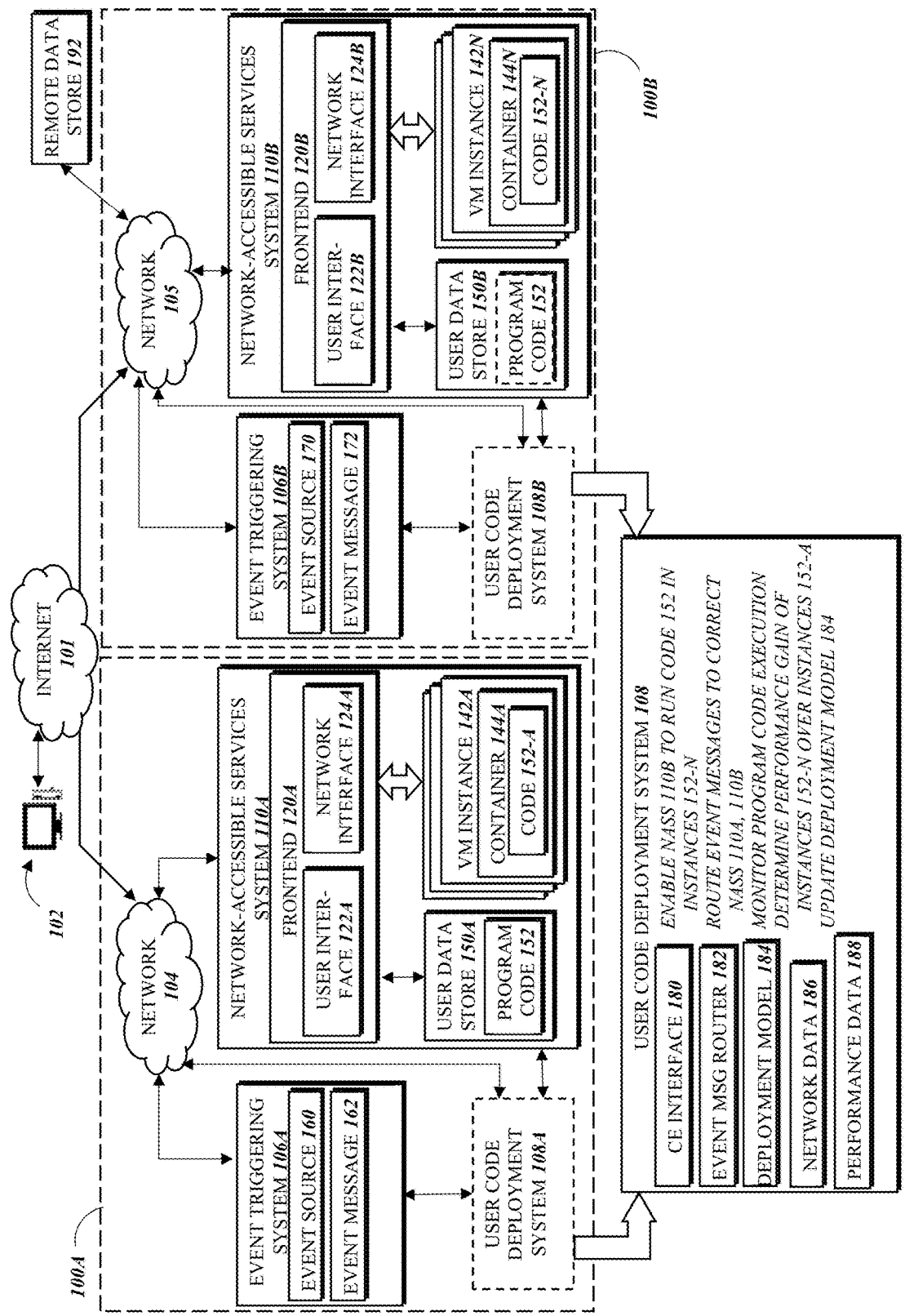
FIG. 1 is a diagram illustrating an exemplary system for deploying program code of a user between isolated computing environments, in accordance with the present disclosure.

Developers that use computing environments, such as a virtual private cloud, to perform computing operations (e.g., execute code, including threads, programs, software, routines, subroutines, processes, etc.) are faced with difficulties in selecting and customizing the proper type, size, number, and duration of compute resources in accordance with their needs. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Additionally, the developer may be unaware that deployments of the developer's software into a particular computing environment may prevent or inhibit the executing software's necessary access to resources and/or networks that are communicatively isolated from the selected computing environment. Thus, an improved method of allowing users to take advantage of the virtual machine instances provided by service providers is desired.

A system can maintain a pool of pre-initialized virtual machine instances that are ready for use as soon as a user request is received, as described in the present disclosure. Specifically, a network-accessible services system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In certain embodiments, elements of the system facilitate transportation or communication of event messages generated in a first programmatic environment (e.g., at an auxiliary service) to the programmatic environment provided by the network-accessible services system described herein. To further facilitate propagation and transportation of a triggered event from the first programmatic environment to the network-accessible services system, event messages may be generated to include information descriptive of the triggered event, a user associated with a request to execute user code in response to the triggered event, and programmatic information to enable the network-accessible services system to convert the event message into a user request for further processing by the network-accessible services system. The event message and/or programmatic information contained therein may be structured according to a schema, a code model, or an application programming interface ("API") to facilitate both creation/generation of the event message at the auxiliary service and conversion/processing of the event message at the network-accessible services system.

In this manner, the system performs an automatic rate matching and scaling between events being triggered on an auxiliary service and the corresponding execution of user code on various virtual machine instances. Thus, the network-accessible services system is capable of responding to events on-demand, whether the events are triggered infrequently (e.g., once per day) or on a larger scale (e.g., hundreds or thousands per second).

The present disclosure provides further aspects of the system, in which elements manage the deployment of user code and the routing of event messages between physically and/or logically isolated computing environments, such as geographical regions. The user code may be deployed in a first region, but may be triggered by events originating in, and/or may need to access or send its processing outputs to a resource on, other regions or remote networks. The network activity of the network-accessible services system may be monitored as it is executing the user code in order to identify networks that receive or provide a significant volume of traffic associated with the user code. If an identified network is associated with a second region, the user code may be deployed into the second region and a subset (e.g., five percent) of the arriving event messages may be routed to the network-accessible services system of the second region for processing.

The performance of user code instances executing in both regions may be monitored for a test period (e.g., two hours or 10,000 events) to determine if the request processing performs better (e.g., latency and/or costs are reduced) when the user code is executed in the second region. If so, the size of the subset of rerouted messages can be gradually increased, while performance is monitored for changes. In various implementations, all of the event messages can eventually be routed to the second region, or the regions can be load-balanced, or only event messages having certain characteristics (e.g., associated event is from an event source in the second region) may be rerouted. In some embodiments, the user code may always exchange data with the same resources, while in others the identification of needed resources may be passed in as, or determined from, input parameters contained in the event message. A deployment model may be developed to describe the programmatic event-handling information that can identify or suggest candidate regions that may facilitate the optimal deployment. Metadata of incoming event messages, execution logs of past user code instances, network monitoring data, performance data, and user-provided parameters such as "blacklist" or "whitelist" of excluded or approved deployment regions, may all be suitable inputs to the data model; the resulting programmatic event-handling information functions as a set of rules for maintaining multiple deployments of the user code and for routing event messages and other triggers.

Referring to FIG. 1, embodiments of the present disclosure may operate within or upon a plurality of computing environments 100A, 100B in which users (e.g., developers, website visitors, etc.) of user computing devices 102 may run various program codes 152 using the virtual computing resources provided by a corresponding network-accessible services system 110A, 110B allocated within the computing environment 100A, B. The computing environments 100A, B may each be one of any suitable type and/or configuration of a compute resource virtualization platform implemented on one or more physical computing devices. Non-limiting examples of computing environments 100A, B include data centers, clusters of data centers organized into zones or regions, a public or private cloud environment a physical or virtual computer network, and the like.

In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The network-accessible services system 110A, B may provide the connecting user computing devices 102 with one or more user interfaces, command-line interfaces (CLI), application programming interfaces (API), and/or other programmatic interfaces for generating and uploading user codes, invoking the user codes (e.g., submitting a request to execute the user codes on the network-accessible services system 110A, B), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the network-accessible services system 110A, B over an internet 101 connection to a communication network 104, 105 that implements or is connected to the corresponding computing environment 100A, B. The network 104, 105 may be any wired network, wireless network, or combination thereof. In addition, the network 104, 105 may be a personal area network, local area network, wide area network, over-the-air broadcast network (e.g., for radio or television), cable network, satellite network, cellular telephone network, or combination thereof. In some embodiments, the network 104, 105 may be a private or semi-private network, such as a corporate or university intranet. In some embodiments, the computing environment 100A is implemented on physical computing devices located in multiple geographically disparate data centers, and the network 104 is the communication network that interconnects the corresponding physical computing devices and data centers.

The network 104, 105 may include one or more wireless networks, such as a Global System for Mobile Communications (GSM) network, a Code Division Multiple Access (CDMA) network, a Long Term Evolution (LTE) network, or any other type of wireless network. The network 104, 105 can use protocols and components for communicating via the Internet or any of the other aforementioned types of networks. For example, the protocols used by the network 104, 105 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

While the advantages of the present disclosure are most fully realized when at least some form of partitioning (i.e., physical and/or logical isolation) inhibits communication between the computing environments 100A, B and/or the networks 104, 105, the present systems and methods can still produce performance gains, such as improved security and/or uptime, redundancy, reduced costs, and reduced local latency, even when there is no partitioning inhibiting communication. Nevertheless, the illustrated and detailed embodiments presume a physical and/or logical barrier, or partition, that causes data transmissions from a first computing environment 100A over a connected first network 104 to a second computing environment 100B and/or the second network 105, to which the second computing environment 100B is connected, to fail, travel slowly, or incur a high computational and/or monetary cost. Non-limiting examples of a physical barrier include an absent, severed, unsecure, low-quality, or expensive communication channel, as well as mere physical distance. Non-limiting examples of a logical barrier include private network boundaries or restrictions, resource allocation partitions, and user authentication measures.

FIG. 1 illustrates a logical barrier in that the computing environments 100A, B are completely independent of each other—there is no automatic sharing or replication of compute resources or stored data, and there are no communication channels between the networks 104, 105 except for the public internet 101. In another embodiment, the computing environments 100A, B may be isolated from each other except for a low-latency data link between them. The barrier may further or instead affect transmissions from the first computing environment 100A to other resources connected to the network 105. For example, the program code 152, when executed as instance 152-A as described below, may process code instructions to transmit output data of the instance 152-A to a remote data store 192 that is in communication with the second network 105. As used herein, any two physical or virtual computing devices, resources, data stores, networks, etc., that suffer such transmission difficulties are said to be "communicatively isolated" from each other.

The network-accessible services systems 110A, B are depicted as operating in a distributed computing environment including several computer systems that are interconnected using one or more computer networks. The network-accessible services system 110A, B could also operate within a computing environment having a fewer or greater number of devices than are illustrated in FIG. 1. Thus, the depiction of the network-accessible services system 110A, B in FIG. 1 should be taken as illustrative and not limiting to the present disclosure. For example, the network-accessible services system 110A, B or various constituents thereof could implement various Web services components, hosted or "cloud" computing environments, and/or peer-to-peer network configurations to implement at least a portion of the processes described herein.

Further, the network-accessible services system 110A, B may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some embodiments, the first network-accessible services system 110A and the second network-accessible services system 110B may be disposed in computing environments 100A, B that are communicatively isolated from each other as described above. The networks 104, 105 may also be communicatively isolated from each other, such as by being disposed within their respective computing environments 100A, B. The computing environments 100A, B may, in some embodiments, be "regions" of an overarching compute resource network, as further illustrated in FIG. 2; these regions may be independent of each other, and may represent a geographic area (e.g., Eastern United States, Western United States, and Europe may all be regions) of the overarching compute resource network. Such independence may mean that the compute resources made available in a particular region are dedicated to that region and are either completely cut off from access by computing systems in other regions, or have such access heavily controlled so as to isolate the region from other regions.

In the exemplary computing environment 100A illustrated in FIG. 1, the network-accessible services system 110A includes a frontend 120A, a user data store 105A storing the program code 152, and a plurality of virtual machine instances including a virtual machine instance 142A that contains a container 144A executing an instance 152-A of the program code 152. These components are described in more detail below with respect to FIG. 2. The frontend 120A provides interfaces for exchanging data with external resources and devices, including a user interface 122A for communicating with user devices 102 and a network interface 124A for sending and receiving data over communication networks such as the network 104 and/or the internet 101. In one example, the frontend 120A receives the program code 152 and/or updates to the program code 152 via the user interface 122A and stores the code in the user data store 150A. Additionally, the frontend 120A communicates with active virtual machine instances; for example, the frontend 120A may provide metadata from the event message to the virtual machine instance 142A, and may receive output data from the virtual machine instance 142A and transmit it to the appropriate destination using the network interface 124A. In the exemplary second computing environment 100B of FIG. 1, the frontend 120B, user interface 122B, and network interface 124B have like functions to their counterparts of the first computing environment 100A.

The exemplary computing environment 100A illustrated in FIG. 1 further includes an event triggering system 106A that may be configured to associate an event or event type with a particular program code 152 to be executed on the network-accessible services system 110A (that is, the event triggering system 106A may store or have access to data which associates the event with the particular program code 152). Thus, the event triggering system 106A may detect that an event was originated by an event source 160 and may designate the event as a trigger for execution of the program code 152. To associate the event with the program code 152, the event triggering system 106A may generate event messages 162 which the network-accessible services system 110A is configured to interpret as being associated with the program code 152 to be executed on the network-accessible services system 110A (that is, the network-accessible services system 110A may store or have access to data which associates the event with the particular program code 152). In another embodiment, an intermediary system or service, such as the user code deployment system 108, may be configured to handle interpretation and routing of event messages 162 to execute the program code, and the event triggering system 106A and the network-accessible services system 110A may or may not store or have access to the event-to-program code association data. For example, the event triggering system 106A may generate an event message 162 that is agnostic to any particular program code to be executed; and the event message 162 may be routed to the network-accessible services system 110A (or the user code deployment system 108) which evaluates the event message 162 and associated metadata to determine which program code to execute in response, and initiate a corresponding request to execute the program code.

The event triggering system 106A may generate the event message 162 according to event trigger and notification configuration settings provided by the user. The configuration settings can specify, for example, a schema, a code model, or an API associated with the program code 152 to be executed by the network-accessible services system 110A in response to the event being triggered. For example the event message 162 may be generated to comprise, among other things, a user account identifier associated with the user, a function identifier to identify a function to be invoked on the network-accessible services system, and one or more event message parameters including any input parameters (required and/or optional) to be provided with the function invocation. In some embodiments, the event message may include data or metadata that indicates the program code to be executed, the language in which the program code is written, the user associated with the request, and/or the computing resources (e.g., memory, etc.) to be reserved for executing the program code. For example, the event message may specify that the user code is to be executed on "Operating System A" using "Language Runtime X."

In one embodiment the format of the event message 162 (or at least a portion of the event message 162) may represent a standard remote procedure call such that the event triggering system 106A may only need to perform minimal processing to provide relevant information in the event message 162 that may be needed to invoke the function on the network-accessible services system. For example, such a standard remote procedure call format may enable an auxiliary system which runs a different operating system or language runtime than the network-accessible services system 110A to seamlessly communicate with the network-accessible services system 110A via the event message generated in such a standard format. In one embodiment the format of the remote procedure call may be provided by the user and designed to match or correspond to the user code to be executed. For example, when an image upload event is detected, the format of the event message may represent a remote procedure call to a function to be executed in response on the network-accessible services system, such as "invoke (generateThumbnail, userID, imageName, imagePath)", or "generateThumbnail (userID, imageName, imagePath)," or similar.

In some embodiments, such as certain instances where a trusted or secure relationship is established between the event triggering system 106A and the network-accessible services system 110A, the event message 162 may further comprise the program code 152 to be executed by the network-accessible services system 110A. For example, the user may provide the user code to the event triggering system 106A instead of or in addition to providing the user code to the network-accessible services system 110A, and further designate that the user code is to be provided with the event message to the network-accessible services system 110A for execution at runtime. In another embodiment, the event message 162 may comprise a location (such as a uniform resource identifier referred to hereafter as a "URI") of the user code to be executed by the network-accessible services system 110A, such that the network-accessible services system 110A can remotely invoke the user code via the URI.

FIG. 1 further illustrates exemplary implementations of a user code deployment system 108, which may be a system implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers. The user code deployment system 108 may be logically disposed outside of any of the computing environments 100A, B in some embodiments. Alternatively, the user code deployment system 108A, B may be implemented within one or more of the computing environments 100A, B. In still other embodiments, the system architecture and functionality of the user code deployment system 108 may be implemented within the network-accessible services systems 110A, B or by the frontend 120A, B or the event triggering system 106A, B. The user code deployment system 108 serves to overcome the partitioning between the computing environments 100A, B, using a computing environment interface 180, in order to enable the network-accessible services system 110B of the second computing environment 100B to execute the program code 152 deployed in the first computing environment 100A. For example, the user code deployment system 108 that is implemented outside of the computing environments 100A, B, or the user code deployment system 108A that is implemented inside the first computing environment 100A, may use the computing environment interface 180 configured to (e.g., having authorization to) access a communication network (e.g., network 105) endpoint within the second computing environment 100B, which endpoint might be associated with the user code deployment system 108B, the frontend 120B, the network interface 124B, or another component of the second computing environment 100B. Through this connection to the endpoint, the user code deployment system 108/108A may deploy the program code 152 into the second computing environment 100B, such as by transmitting to the frontend 120B the program code 152 along with an instruction to store the program code 152 in the user data store 150B.

In one embodiment, the user code deployment system 108 may enable the second network-accessible services system 110B to execute the program code 152 by copying the program code 152 from the user data store 150A to the user data store 150B of the second network-accessible services system 110B. As stated above, the program code 152 may contain all of the instructions and metadata needed for an appropriately configured virtual machine instance 142N and container 144N to be allocated and an instance 152-N of the program code 152 launched. Thus, the program code 152 is "deployed" to the second computing environment 100B. In another embodiment, the user code deployment system 108 may embed the program code 152 in one or more of the event messages that are routed to the second network-accessible services system 110B as described below, and the frontend 120B may extract the program code 152 and store the program code 152 in the user data store 150B and/or launch an instance 152-N of the program code to execute using the associated event message. In some embodiments, the program code 152 may not be stored in the user data store 150B; correspondingly, the network-accessible services system 110B may be re-enabled every time it receives an event message routed from the user code deployment system 108 and containing the program code 152. In another embodiment, the user code deployment system 108 or a routed event message may provide a URI or other address for the program code 152 and the second network-accessible services system 110B may remotely call or retrieve the program code 152 in order to launch an instance 152-N of it.

In the illustrated user code deployment system 108, 108A-B, an event message router 182 may intercept the event messages 162 intended for the first network-accessible services system 110A, and may determine the appropriate destination for the event messages 162. In some embodiments, the routing decision may incorporate data from several inputs, including without limitation: the deployment model 184, which may include programmatic event-handling information developed via machine learning, event and program code execution logs, and user input; accumulated network data 186 related to the execution of the program code 152; past performance data 188 containing metrics, such as total execution time and latency, obtained from previous monitored program code executions on one or more of the network-accessible services systems 110A, B; and the various metadata of the event message 162 itself. The routing decision may further incorporate metrics relating to compute resource availability on each of the network-accessible services systems 110A, B, collected as described below and sent to the user code deployment system 108. In other embodiments, the routing may require little or no data analysis, such as when the user code deployment system 108 is conducting a test for comparing execution performance, and simply selects the destination network-accessible services system 110A, B in accordance with the test parameters.

In various embodiments, the event message router 182 may make the above routing decision and then perform one or more actions to route the event messages 162 to the appropriate destination(s). If the routing decision indicates that the original destination of the event message 162 is the appropriate destination, the event message router 182 may simply allow the event message 162 to pass through to the original destination. When the appropriate destination is different from the original destination, the event message router 182 may reroute the event message 162. In one embodiment, the event message router 182 may be configured to reroute the event message 162 by sending a response to the "provider" of the event message 162, which may be the event triggering system 106A, the event source 160, or another component of the first computing environment 100A that creates or detects the event and/or generates the event message 162 and sends it to the frontend 120A. The response may include instructions to the event provider to regenerate the event message 162 and/or resend the event message 162 with the appropriate destination in place of the original destination. The event provider may then reissue the event message 162 to, e.g., the frontend 120B of the second computing environment 100B. In another embodiment, the event message router 182 may modify the event message 162 to contain a new destination and/or other information about the routing decision, and then may send the modified event message 162 to the appropriate destination. In yet another embodiment, the event message router 182 may simply relay the entire original event message 162 to the appropriate destination in the second computing environment 100B.

In another embodiment, the event message router 182 may be configured to broadcast or multicast the event message 162 to multiple computing environments 100A, 100B, and the user code deployment systems 108A, B or the frontends 120A, B of each computing environment 100A, B may be configured to determine whether the event message 162 is intended for processing by the locally-executing program code 152. In another embodiment, the event message router 182 may determine that the appropriate destination is different from the original destination and may generate an alert to an owner of the program code 152 to reconfigure the event provider and/or the deployment model 184 so that future event messages like the event message 162 are generated and sent to the appropriate destination. The alert may, for example, be delivered to the user device 102 via a user interface 122A.

The user code deployment system 108 may be further configured to monitor, record, and/or receive (i.e., from another monitoring service) compute activity while the event message 162 is being processed and the program code 152 is being executed in response. The compute activity to be monitored may include network 104/105 activity such as Internet protocol ("IP") traffic and domain name service ("DNS") lookups, and virtual machine 142A activity logs. The user code deployment system 108 may use the computing environment interface 180 and any other suitable network interfaces to obtain the compute activity. The user code deployment system 108 may further include program instructions and compute resources for calculating performance metrics from the compute activity, and for updating the deployment model 184, as described further below.

The second computing environment 100B of FIG. 1 may be connected to networks and/or resources that are communicatively isolated from the first computing environment 100A, and/or may simply be physically closer than the first computing environment 100A to such networks and/or resources. Additionally or alternatively, the second computing environment 100B may have more, less costly, and/or otherwise better-suited compute resources for processing the event messages 162. The second computing environment 100B may include an event triggering system 106B for creating event messages 172 for events originating from a local event source 170, as described above. Such events may be designated to trigger the program code 152; in absence of the user code deployment system 108, the event triggering system 106B sends the event messages 172 associated with such events to the network-accessible services system 110A over the internet 101. The user code deployment system 108/108B may intercept the event messages 172 and, in one embodiment, may return them to the second network-accessible services system 110B after enabling the second network-accessible services system 110B to execute the program code 152. In another embodiment, the user code deployment system 108, after enabling the second network-accessible services system 110B to execute the program code 152, may coordinate the event triggering system 106B to modify the creation process followed to generate the event message 172. For example, the modification may enable the event triggering system 106B to generate event messages 172 for the program code 152 that are delivered to and processed by the frontend 120B. This increases the execution speed by eliminating the transmission of the event message 172 to and from the user code deployment model 108.

Figure 2:
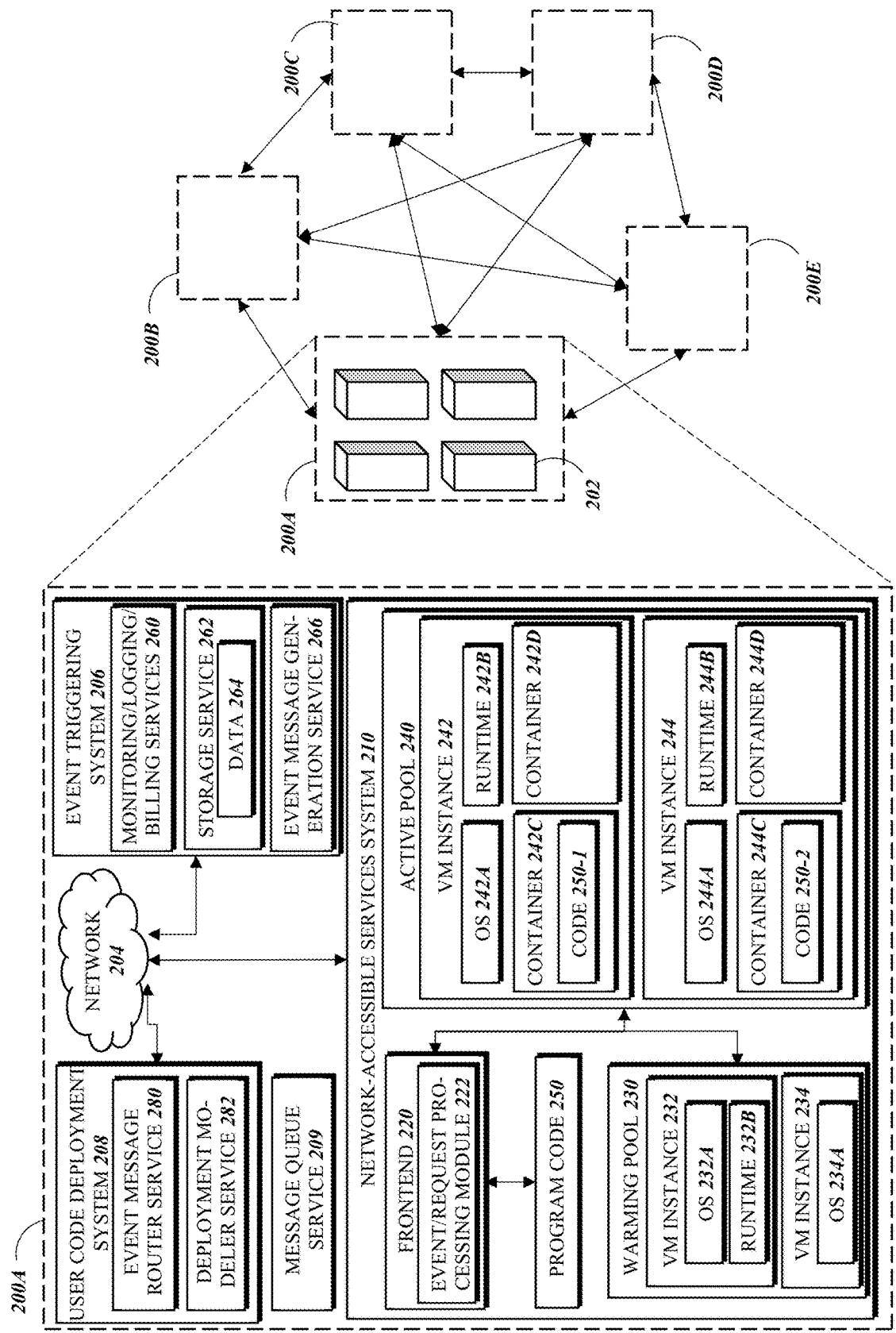
FIG. 2 is a diagram illustrating another exemplary system for deploying program code of a user between isolated computing environments, in accordance with the present disclosure.

FIG. 2 shows an exemplary geographical abstraction of independent computing environments 200A-E implemented on communicatively isolated sets of servers 202, and incorporating the present systems for bridging physical and logical partitions to automatically deploy program code of a user into the optimal computing environment(s). FIG. 2 further provides another logical service level view of a computing environment 200A implementing the present system. The computing environment 200A includes a more detailed and reorganized layout of the systems illustrated in the computing environment 100A of FIG. 1 and described above.

A network-accessible services system 210 includes a frontend 220, a managed warming pool 230, and a managed active pool 240. In the depicted example, virtual machine instances ("instances") 232, 234 are shown in the warming pool 230 managed by a warming pool manager, and instances 242, 244 are shown in the active pool 240 managed by a worker manager. The illustration of the various components within the network-accessible services system 210 is logical in nature and one or more of the components can be implemented by a single computing device or multiple computing devices. For example, the instances 232, 234, 242, 244 can be implemented on one or more physical computing devices in different various geographic regions. Similarly, each of the frontend 220, the warming pool 230, and the active pool 240 can be implemented across multiple physical computing devices. Alternatively, one or more of the frontend 220, the warming pool 230, and the active pool 240 can be implemented on a single physical computing device. In some embodiments, the network-accessible services system 210 may comprise multiple frontends, multiple warming pool managers, and/or multiple worker managers. Although four virtual machine instances are shown in the example of FIG. 2, the embodiments described herein are not limited as such, and one skilled in the art will appreciate that the network-accessible services system 210 may comprise any number of virtual machine instances implemented using any number of physical computing devices. Similarly, although a single warming pool 230 and a single active pool 240 are shown in the example of FIG. 2, the embodiments described herein are not limited as such, and one skilled in the art will appreciate that the network-accessible services system 210 may comprise any number of warming pools and active pools.

In the example of FIG. 2, the network-accessible services system 210 is illustrated as being connected to the network 204. In some embodiments, any of the components within the network-accessible services system 210 can communicate with other components of the computing environment 200A via the network 204. In other embodiments, not all components of the network-accessible services system 210 are capable of communicating with other components of the computing environment 200A. In one example, only the frontend 220 may be connected to the network 204, and other components of the network-accessible services system 210 may communicate with other components of the computing environment 200A via the frontend 220.

Users may use the network-accessible services system 210 to execute program code provided (e.g., via upload) by a user. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request the network-accessible services system 210. The network-accessible services system 210 can handle the acquisition and configuration of compute capacity (e.g., containers, instances, etc., which are described in greater detail below) based on the code execution request, and execute the code using the compute capacity. The network-accessible services system 210 may automatically scale up and down based on the volume by executing additional copies of the code, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 220 receives and processes all the requests (sometimes in the form of event messages) to execute program code on the network-accessible services system 210. In one embodiment, the frontend 220 serves as a front door to all the other services provided by the network-accessible services system 210. The frontend 220 processes the requests generated, for example, in response to events and makes sure that the requests are properly authorized. For example, the frontend 220 may determine whether the user associated with the request is authorized to run the program code specified in the request.

The user/program code 250 as used herein may refer to any program code (e.g., a program, routine, subroutine, thread, etc.) written in a specific program language. In the present disclosure, the terms "code," "user code," "function," and "program code," may be used interchangeably. Such user code 250 may be executed to achieve a specific task, for example, in connection with an event generated by a particular web application or mobile application developed by the user. For example, the user codes 250 may be written in JavaScript (nodejs), Java, Python, and/or Ruby. The request and/or corresponding event message may include an identifier of the event used to identify the function, the user code 250 (or the location thereof), and one or more arguments to be used for executing the user code 250. For example, the user may provide the user code 250 along with the request to execute the user code 250 in response to the occurrence of one or more events. In another example, the request may identify a previously uploaded program code 250 (e.g., using the API for uploading the code) by its name or its unique ID and one or more triggering conditions for executing the function. In yet another example, the user code 250 may be included in the request as well as uploaded in a separate location (e.g., the storage service 262 or a storage system internal to the network-accessible services system 210) prior to the request being received by the network-accessible services system 210. In still another example, the user code 250 may be deployed in another computing environment 200B-E and may be provided to the network-accessible services system 210 by the user code deployment system 208 in order to enable the network-accessible services system to execute the user code 250. The network-accessible services system 210 may vary its code execution strategy based on where the code is available at the time the request is processed.

The frontend 220 may receive the request to execute such user codes in response to Hypertext Transfer Protocol Secure (HTTPS) requests from a user or in response to triggering events. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 220. The frontend 220 may also receive the request to execute such user codes when an event is detected, such as an event that the user has registered to trigger automatic request generation. Alternatively, the user may have registered a timed job (e.g., execute the user code every 24 hours). In such an example, when the scheduled time arrives for the timed job, the request to execute the user code may be sent to the frontend 220. A timed or scheduled job may be implemented using the techniques of this disclosure to, for example, model the job as an event generated by a timer service. For example, the timer service may generate an event message indicating that it is now time to run a user code, and the network-accessible services system 210 may implement a process to run code at a certain time by utilizing the timer service to remind the network-accessible services system 210 to run the user code. In yet another example, the frontend 220 may include or have access to a queue of incoming code execution requests (e.g., a message queue service 209), and when the user's batch job is removed from the network-accessible services system's work queue, the frontend 220 may process the user request.

In yet another example, the request may originate from another component within the network-accessible services system 210 or other servers or services not illustrated in FIG. 2. In particular, the request may be delivered to the network-accessible services system 210 by the user code deployment system 208 (illustrated as a component of the computing environment 200A but alternatively implemented outside of the computing environment 200A as described above with respect to FIG. 1). That is, the request may be embodied in an event message generated in another computing environment and routed to the network-accessible services system 210 via the user code deployment system 208 as described herein.

In any of the examples described above and throughout this disclosure, an event message representative of a request to execute the user code 250 may be initially received by a message queue service 209 and provided to or placed in a message queue. In certain embodiments the frontend 220 may periodically poll the message queue service 209 to identify and retrieve event messages for processing. Message events may be placed in the message queue for example by the message queue service 209, such as in response to when an event is detected for which the user has registered to trigger automatic generation of a request to execute user code 250. In some instances it may be desirable or more practical to detect such events, trigger generation of an event message, and provide the event message to the message queue service 209. For example, depending on the embodiment, the message queue service 209 may be configured to allow ordering of message events so that certain message events may receive a higher priority. In another example, the message queue service 209 may be specifically or specially configured to facilitate transportation of certain types of programmatic events, such as database operations, certain types of data suitable for batch processing, and so on. In one embodiment the message queue service 209 may be configured to provide streaming, and/or ordered transport of messages (for example, as a sharded set of data). The frontend 220 may then poll the message queue service 209 and retrieve event messages for further processing by the network-accessible services system 210.

In another embodiment, any event messages to be delivered to the network-accessible services system 210 may be received first by the user code deployment system 208 in order to determine whether the event message should be rerouted. If the event message is properly destined from the network-accessible services system 210, the user code deployment system 208 may pass the event message to the message queue service 209. In another embodiment, instead of or in combination with using the message queue service 209, the frontend 220 may query the event triggering system 206 and/or the user code deployment system 208 directly to request and receive event messages for further processing. In another embodiment, the event triggering system 206 may interface directly with the frontend 220 via one or more APIs and function calls. For example, when an event is detected and an event message is generated, the event triggering system 206 may invoke an API provided by the frontend 220 to provide the event message directly to the frontend 220, without necessarily providing the event message to the message queue service 209. This embodiment is particularly useful when the functions of the user code deployment system 208 are implemented in the frontend 220.

A user request may specify one or more third-party libraries (including native libraries) to be used along with the user code 250. In one embodiment, the user request includes a package file (for example, a compressed file, a ZIP file, a Roshal archive file, i.e., a "RAR" file, etc.) containing the user code and any libraries (and/or identifications of storage locations thereof). In some embodiments, the user request includes metadata that indicates the program code 250 to be executed, the language in which the program code is written, the user associated with the request, and/or the computing resources (e.g., memory, etc.) to be reserved for executing the program code. For example, the program code 250 may be provided with the request, previously uploaded by the user, provided by the network-accessible services system 210 (e.g., standard routines), provided from another computing environment 200B-E via the user code deployment system 208, and/or provided by third parties. In some embodiments, such resource-level constraints (e.g., how much memory is to be allocated for executing a particular user code) are specified for the particular user code, and may not vary over each execution of the user code. In such cases, the network-accessible services system 210 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the network-accessible services system 210 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the network-accessible services system 210 may inspect the request and look for the flag or the header, and if it is present, the network-accessible services system 210 may modify the behavior (e.g., logging facilities) of the container in which the user code is executed, and cause the output data to be provided back to the user. In some embodiments, the behavior/mode indicators are added to the request by the user interface provided to the user by the network-accessible services system 210. Other features such as source code profiling, remote debugging, etc. may also be enabled or disabled based on the indication provided in the request. The user code deployment system 208 may also use the indicator, flag, header, or other behavior specification when determining where to route the request.

In some embodiments, the network-accessible services system 210 may include multiple frontends 220. In such embodiments, a load balancer may be provided to distribute the incoming requests and/or event messages to the multiple frontends 220, for example, in a round-robin fashion.

The warming pool manager ensures that virtual machine instances in the warming pool 230 are ready to be launched into the active pool 240 when the network-accessible services system 210 receives a request to execute user code 250 on the network-accessible services system 210. In the example illustrated in FIG. 2, the warming pool manager manages the warming pool 130, which is a group (sometimes referred to as a pool) of pre-initialized and pre-configured virtual machine instances that may be used to service incoming user code execution requests. In some embodiments, the warming pool manager causes virtual machine instances to be booted up on one or more physical computing machines within the network-accessible services system 210 and added to the warming pool 230 prior to receiving a code execution request that will be executed on the virtual machine instance. In other embodiments, the warming pool manager communicates with an auxiliary virtual machine instance service to create and add new instances to the warming pool 230. For example, the warming pool manager may cause additional instances to be added to the warming pool 230 based on the available capacity in the warming pool 230 to service incoming requests. In some embodiments, the warming pool manager may utilize both physical computing devices within the network-accessible services system 210 and one or more virtual machine instance services to acquire and maintain compute capacity that can be used to service code execution requests received by the frontend 220. In some embodiments, the network-accessible services system 210 may comprise one or more logical knobs or switches for controlling (e.g., increasing or decreasing) the available capacity in the warming pool 230. For example, a system administrator may use such a knob or switch to increase the capacity available (e.g., the number of pre-booted instances) in the warming pool 230 during peak hours. In some embodiments, virtual machine instances in the warming pool 230 can be configured based on a predetermined set of configurations independent from a specific user request to execute a user's code. The predetermined set of configurations can correspond to various types of virtual machine instances to execute user codes. The warming pool manager can optimize types and numbers of virtual machine instances in the warming pool 230 based on one or more metrics related to current or previous user code executions.

As shown in FIG. 2, instances may have operating systems (OS) and/or language runtimes loaded thereon. For example, the warming pool 230 comprises instances 232, 234. The instance 232 includes an OS 232A and a runtime 232B. The instance 234 includes an OS 234A. In some embodiments, the instances in the warming pool 230 may also include containers (which may further contain copies of operating systems, runtimes, user codes, etc.), which are described in greater detail below. Although the instance 232 is shown to include a single runtime, in other embodiments, the instances may include two or more runtimes, each of which may be used for running a different user code. In some embodiments, the warming pool manager may maintain a list of instances in the warming pool 230. The list of instances may further specify the configuration (e.g., OS, runtime, container, etc.) of the instances.

In some embodiments, the virtual machine instances in the warming pool 230 may be used to serve any user's request. In one embodiment, all the virtual machine instances in the warming pool 230 are configured in the same or substantially similar manner. In another embodiment, the virtual machine instances in the warming pool 230 may be configured differently to suit the needs of different users. For example, the virtual machine instances may have different operating systems, different language runtimes, and/or different libraries loaded thereon. In yet another embodiment, the virtual machine instances in the warming pool 230 may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 230, each having identically-configured virtual machine instances, are provided.

The warming pool manager may pre-configure the virtual machine instances in the warming pool 230, such that each virtual machine instance is configured to satisfy at least one of the operating conditions that may be requested or specified by the user request to execute program code on the network-accessible services system 210. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the network-accessible services system 210, the user interface may prompt the user to specify one of the predetermined operating conditions for executing the user code. In another example, the service-level agreement (SLA) for utilizing the services provided by the network-accessible services system 210 may specify a set of conditions (e.g., programming languages, computing resources, etc.) that user requests should satisfy, and the network-accessible services system 210 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); etc.

The worker manager manages the instances in the active pool 240 used for servicing incoming code execution requests. In the example illustrated in FIG. 1, the active pool 240 is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager may assign the instances and the containers according to one or more policies that dictate which requests can be executed in which containers and which instances can be assigned to which users. An example policy may specify that instances are assigned to collections of users who share the same account (e.g., account for accessing the services provided by the network-accessible services system 210). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 2, instances may have operating systems (OS), language runtimes, and containers. The containers may have individual copies of the OS and the runtimes and user codes loaded thereon. In the example of FIG. 2, the active pool 240 managed by the worker manager includes the instances 242, 244. The instance 242 has an OS 242A, a runtime 242B, and containers 242C, 242D. The container 242C includes a copy, or instance 250-1, of the program code 250. The instance 244 has an OS 244A, a runtime 244B, and containers 244C, 244D. The container 244C includes a copy, or instance 250-2, of the program code 250. As illustrated in FIG. 2, instances may have user codes loaded thereon, and containers within those instances may also have user codes loaded therein. In some embodiments, the worker manager may maintain a list of instances in the active pool 240. The list of instances may further specify the configuration (e.g., OS, runtime, container, etc.) of the instances. In some embodiments, the worker manager may have access to a list of instances in the warming pool 230 (e.g., including the number and type of instances). In other embodiments, the worker manager requests compute capacity from the warming pool manager without having knowledge of the virtual machine instances in the warming pool 230.

In the example illustrated in FIG. 2, user code instances 250-1, 250-2 are executed in isolated compute systems referred to as containers (e.g., containers 242C, 242D, 244C). Containers are logical units created within a virtual machine instance using the resources available on that instance. For example, the worker manager may, based on information specified in the request to execute user code 250, create a new container or locate an existing container in one of the instances in the active pool 240 and assigns the container to the request to handle the execution of the user code 250 associated with the request. In one embodiment, such containers are implemented as Linux containers. The virtual machine instances in the active pool 240 may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 220, the worker manager finds capacity to service the request to execute user code 250 on the network-accessible services system 210. For example, if there exists a particular virtual machine instance in the active pool 240 that has a container with the same user code loaded therein (e.g., code 250-1 shown in the container 242C), the worker manager may assign the container to the request and cause the user code to be executed in the container. Alternatively, if the user code is available in the local cache of one of the virtual machine instances, the worker manager may create a new container on such an instance, assign the container to the request, and cause the user code 250 to be loaded and executed in the container. If the worker manager determines that the user code 250 associated with the request is not found on any of the instances (e.g., either in a container or the local cache of an instance) in the active pool 240, the worker manager may determine whether any of the instances in the active pool 240 is currently assigned to the user associated with the request and has compute capacity to handle the current request. If there is such an instance, the worker manager may create a new container on the instance and assign the container to the request. Alternatively, the worker manager may further configure an existing container on the instance assigned to the user, and assign the container to the request. For example, the worker manager may determine that the existing container may be used to execute the user code if a particular library demanded by the current user request is loaded thereon. In such a case, the worker manager may load the particular library and the user code onto the container and use the container to execute the user code.

If the active pool 240 does not contain any instances currently assigned to the user, the worker manager pulls a new virtual machine instance from the warming pool 230, assigns the instance to the user associated with the request, creates a new container on the instance, assigns the container to the request, and causes the user code to be downloaded and executed on the container. In some embodiments, the worker manager and/or warming pool manager may report status information about their respective pools, such as present capacity, to the user code deployment system 208, which may include such information in determining whether to reroute event messages to another computing environment.

In some embodiments, the network-accessible services system 210 is adapted to begin execution of the user code shortly after it is received (e.g., by the frontend 220). A time period can be determined as the difference in time between initiating execution of the user code (e.g., in a container on a virtual machine instance associated with the user) and receiving a request to execute the user code (e.g., received by a frontend). Another time period can be determined as the difference in time between (1) detection of an event on an event-triggering service and (2a) receiving a request to execute the user code (e.g., received by a frontend) and/or (2b) initiating execution of the user code (e.g., in a container on a virtual machine instance associated with the user). Another time period can be determined as the difference in time between (1) retrieving, accessing, or receiving an event message (e.g., directly or indirectly from on an event-triggering service) and (2) initiating processing of a request to execute the user code (e.g., in a container on a virtual machine instance associated with the user). The network-accessible services system 210 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the network-accessible services system 210 is adapted to begin execution of the user code within a time period that is less than a predetermined duration if one or more conditions are satisfied. For example, the one or more conditions may include any one of: (1) the user code is loaded on a container in the active pool 240 at the time the request is received; (2) the user code is stored in the code cache of an instance in the active pool 240 at the time the request is received; (3) the active pool 240 contains an instance assigned to the user associated with the request at the time the request is received; or (4) the warming pool 230 has capacity to handle the request at the time the request is received. In some embodiments, the one or more conditions may include conditions for determining whether to route event messages to another computing environment for processing. For example the event message router service 280 may be adapted to determine that a rerouting time from the first computing environment 200A to a second computing environment 200B that will be incurred is less than a wait time that will be incurred for a queued event message to be processed by the frontend 220, and may reroute the queued event message to the second computing environment 200B in response to the determination.

The event triggering system 206 may include, as event sources and/or as data processing services for handling events, monitoring/logging/billing services 260, a storage service 262, and an event message generation service 266.

The monitoring/logging/billing services 260 may include: a monitoring service for managing monitoring information received from the network-accessible services system 210, such as statuses of containers and instances on the network-accessible services system 210; a logging service for managing logging information received from the network-accessible services system 210, such as activities performed by containers and instances on the network-accessible services system 210; and a billing service for generating billing information associated with executing user code on the network-accessible services system 210 (e.g., based on the monitoring information and/or the logging information managed by the monitoring service and the logging service). In addition to the system-level activities that may be performed by the monitoring/logging/billing services 260 (e.g., on behalf of the network-accessible services system 210) as described above, the monitoring/logging/billing services 260 may provide application-level services on behalf of the user code executed on the network-accessible services system 210. For example, the monitoring/logging/billing services 260 may monitor and/or log various inputs, outputs, or other data and parameters on behalf of the user code being executed on the network-accessible services system 210.

Any of the monitoring, logging, and billing functions may produce one or more events which may be designated for triggering the program code 250. Although shown as a single block, the monitoring, logging, and billing services 260 may be provided as separate services, and may further be independent of the event triggering system 206. Additionally or alternatively, the monitoring/logging/billing services 260 may be registered or configured to be polled or queried for events to trigger execution of user codes on the network-accessible services system 210. Such registration or configuration may be provided or enabled via the one or more user interfaces provided to the user computing devices. For example, a user interface may provide options for the user to select or specify monitoring/logging/billing services 260 as an event-triggering service, such that the monitoring/logging/billing services 260 may be periodically polled or queried for events such as by an intermediary polling system.

The storage service 262 may be any suitable physical or logical data store equipped within input and output control functions and further configured to operate as an event source and triggering service. In particular, the storage service stores and maintains data 264, and may generate an event when a specified operation is performed on the data 264. For example, in response to an end user uploading a new image from a user computing device to the storage service 262, the storage service 262 can generate an event that triggers a request to execute/activate a program code to generate a thumbnail of the image. The program code may be hosted in the active pool 240 or downloaded from the storage service 262 to the network-accessible services system 210. Although only the storage service 262 is illustrated in the example of FIG. 2, the computing environment 200A may include other levels of storage systems from which the user code (e.g., program code 250) may be downloaded. For example, each instance may have one or more storage systems either physically (e.g., a local storage resident on the physical computing system on which the instance is running) or logically (e.g., a network-attached storage system in network communication with the instance and provided within or outside of the network-accessible services system 210) associated with the instance on which the container is created.

The event message generation service 266 is invoked to produce an event message for a generated event in the event triggering system 206. The generation process may be guided by one or more commands that may be user-provided or imposed by one or more components of the system. In one embodiment, when the user code deployment system 208 successfully migrates program code or makes a change to the deployment model, the user code deployment system 208 may provide one or more new commands to the event message generation service 266 to implement the migration/changes. For example, if the program code 250 is newly deployed in the computing environment 200A, and the event message generation service 266 previously generated event messages for events triggering the program code 250 in its previous computing environment (e.g., computing environment 200B), the new commands may instruct the event message generation service 266 to generate event messages identifying a destination of the present computing environment 200A.

The user code deployment system 208 of FIG. 2 includes an event message router service 280 and a deployment modeler service 282. The event message router service 280 performs data analysis on event messages, using some or all of the methods and data described above with respect to FIG. 1 and below with respect to FIGS. 3-6, in order to determine the optimal computing environment 200A-E for executing the program code 250 in response to the event message. The event message router service 280 may communicate with the other components of the computing environment 200A and with components of other computing environments 200B-E to collect data such as monitoring and logging information, compute resource capacity, the program code 250 itself, etc. This data may be used to route event messages, and may also be incorporated into the deployment model by the deployment modeler service 282.

Figure 3:
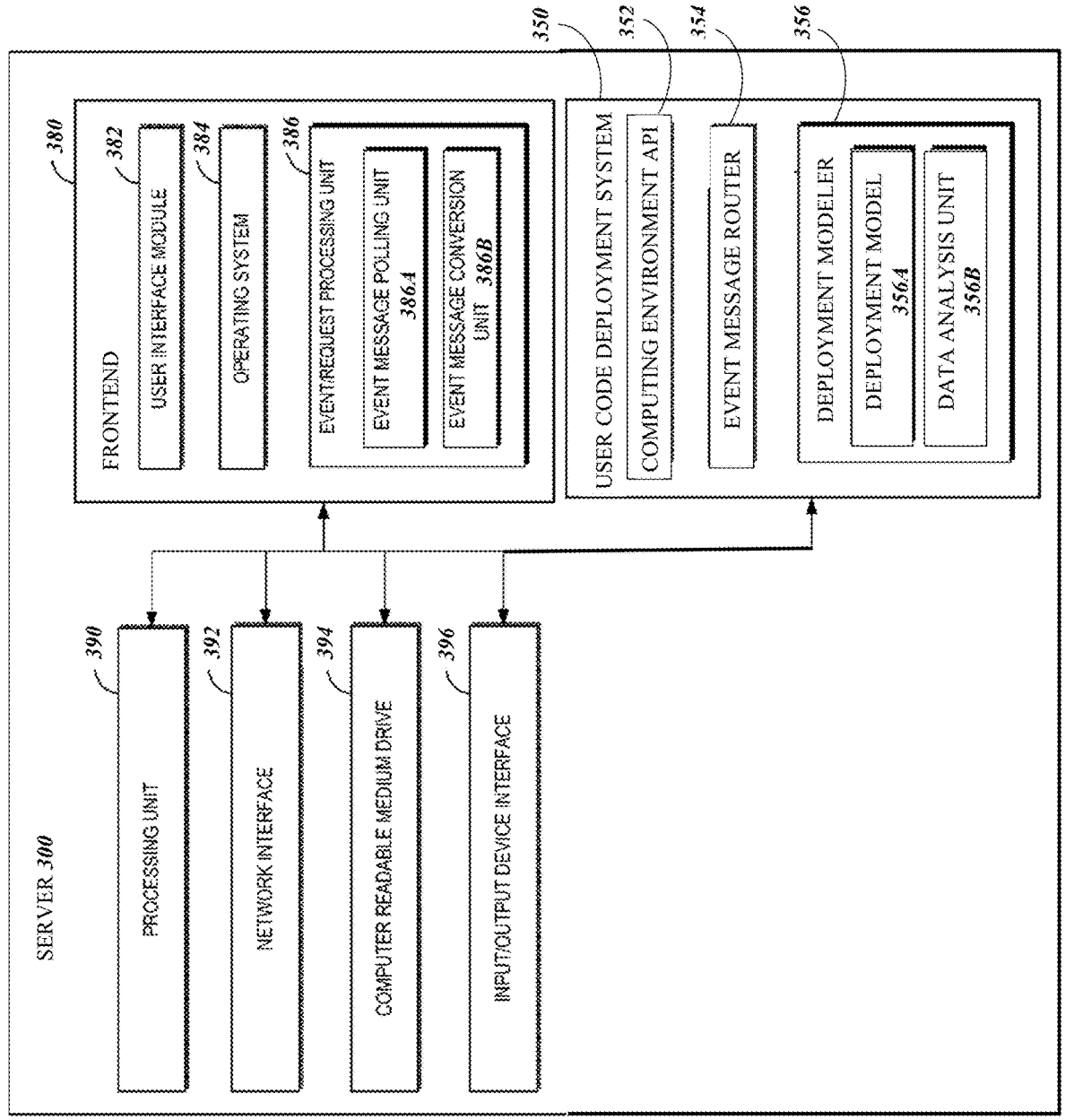
FIG. 3 is a block diagram of an exemplary computing device architecture providing a frontend and a user code deployment system that cooperate for processing user requests to execute program codes.

FIG. 3 depicts a general architecture of a computing system (referenced as server 300) that processes event messages for user requests to execute program codes in a network-accessible services system. The general architecture of the server 300 includes an arrangement of computer hardware and software modules that may be used to implement aspects of the present disclosure. The hardware modules may be implemented with physical electronic devices, as discussed in greater detail below. The server 300 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIGS. 1 and 2, including the user code deployment system which may alternatively be implemented in a separate architecture from the frontend. As illustrated, the server 300 includes a processing unit 390, a network interface 392, a computer readable medium drive 394, an input/output device interface 396, all of which may communicate with one another by way of a communication bus. The network interface 392 may provide connectivity to one or more networks or computing systems. The processing unit 390 may thus receive information and instructions from other computing systems or services via a communication network. The processing unit 390 may also communicate to and from memory 350, 380 and further provide output information for an optional display (not shown) via the input/output device interface 396. The input/output device interface 396 may also accept input from an optional input device (not shown).

The memory 350, 380 may contain computer program instructions (grouped as modules in some embodiments) that the processing unit 390 executes in order to implement one or more aspects of the present disclosure. The memory 350, 380 generally includes random access memory ("RAM"), read-only memory ("ROM") and/or other persistent, auxiliary or non-transitory computer-readable media. The memory 350, 380 may store an operating system 384 that provides computer program instructions for use by the processing unit 390 in the general administration and operation of the worker manager. The memory 350, 380 may further include computer program instructions and other information for implementing aspects of the present disclosure. For example, in one embodiment, a frontend memory 380 includes a user interface unit 382 that generates user interfaces (and/or instructions therefor) for display upon a computing device, e.g., via a navigation and/or browsing interface such as a browser or application installed on the computing device. In addition, the frontend memory 380 may include and/or communicate with one or more data repositories (not shown), for example, to access user program codes and/or libraries.

In addition to and/or in combination with the user interface unit 382, the frontend memory 380 may include an event/request processing unit 386 which may include an event message polling unit 386A and an event message conversion unit 386B that may be executed by the processing unit 390. In one embodiment, the user interface unit 382, the event message polling unit 386A, and the event message conversion unit 386B individually or collectively implement various aspects of the present disclosure, e.g., processing an event message for a request to executed user code, as described herein. In another embodiment, a separate polling service may be implemented, for example via a polling fleet configured to poll an event source or a message queue and perform at least an initial message conversion or processing to prepare the event message for further processing. The event message conversion unit 386B manages the conversion of the event message into a request to execute user code. In one embodiment the event message is generated in a format representative of a remote procedure call to facilitate rapid conversion and/or immediate function invocation by the network-accessible services system when the event message is processed. Such an implementation enables a high degree of functional transparency and reduced latency between an auxiliary system responding to an event trigger and the network-accessible services system processing the event message generated by the auxiliary system responsive to the event trigger.

In one embodiment, a user code deployment system memory 350 includes a computing environment API 352 that interfaces with communicatively isolated computing environments in order to facilitate data exchange. In addition, the user code deployment system memory 350 may include and/or communicate with one or more data repositories (not shown), for example, to access user program codes and/or libraries. The event message router module 354 includes program instructions executed to make routing decisions for event messages as described herein. The deployment modeler module 356 includes the deployment model 356A, stored in memory 350, and program instructions for incorporating new data (e.g., performance data) into the deployment model 356A using the data analysis unit 356B.

Figure 4:
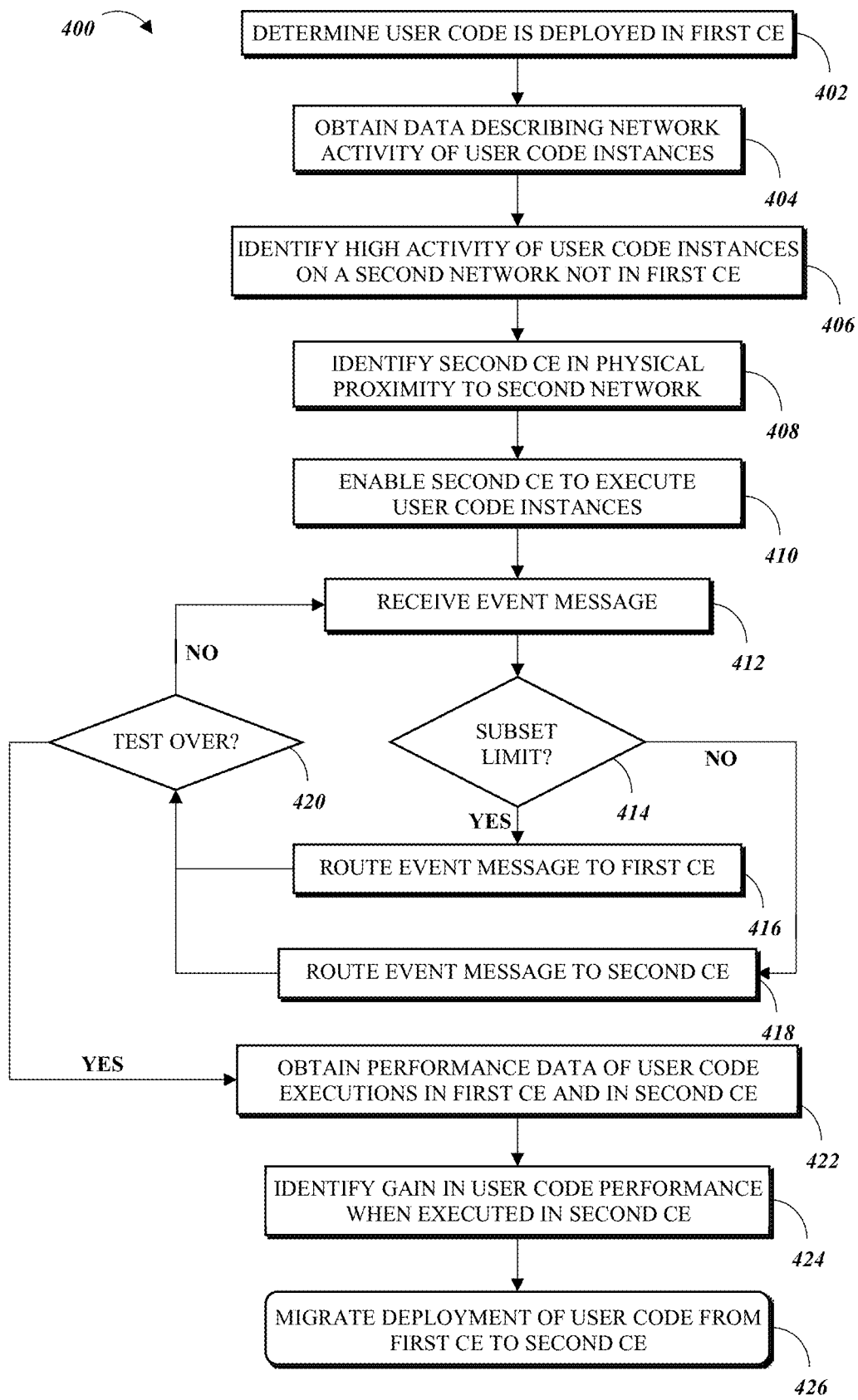
FIG. 4 is a flow diagram of an exemplary method for determining an optimal program code deployment and routing of event messages, in accordance with the present disclosure.

Turning now to FIG. 4, a method 400 implemented by the components of the user code deployment system, described above, performs a test migration of a subset of program code instances from a first network-accessible services system where the program code is deployed to a second network-accessible services system that might execute the program code more efficiently. At block 402, the system determines that the user code is deployed in the first computing environment, i.e., on or accessible by the first network-accessible services system over a first network within the first computing environment. In various exemplary embodiments, the system may access one or more data stores, memories, or other electronic storage devices to retrieve a value of a parameter, such as a flag indicating the user code is deployed in the first computing environment, or to determine that one or more files containing the user code are present on a system within the first computing environment. At step 404, the system obtains network data describing the network activity of previous executed user code instances. The system may collect the network data by monitoring the program code executions itself, or the system may obtain the network data from a monitoring service, an electronic data store, or another source. The network data may have been collected at a single source or at a plurality of sources and may contain different types of useful information, such as IP traffic through different interfaces of the network-accessible services system, activity logs from various applications and event sources, DNS lookup calls, and the like.

Using the network data, at step 406 the system may identify a high (e.g., above a predetermined threshold of uninteresting activity) amount of traffic/activity on a second network that is not within the first computing environment, and that further may be communicatively isolated from the first network-accessible services system; this activity may be inefficient because it is blocked or impeded by a barrier. For example, the system may identify, from the network data, one or more endpoints representing systems or resources that the first network-accessible services system attempts to access while executing the user code, and may determine, such as from a network address, that the endpoints are accessed using the second network. At step 408, the system identifies a second computing environment containing a second network-accessible services system that is implemented on or connected to, and may be much closer than the first computing environment to, the second network. For example, the system may access records in a data store, or a lookup table stored in memory accessible in the first computing environment, to determine that the second computing environment is associated with the second network. The system may further determine from the records/lookup table that processing data transfers on the second network is faster or more efficient from the second computing environment than from the first computing environment; for example, the records/lookup table may store data access and/or transfer times obtained from the network data.

At step 410, the system enables the second network-accessible services system to execute the user code. Several embodiments of enabling/deploying have been described above; for example, the system may establish communication with the second virtual compute space using a computing environment API, and may send a copy of the user code and other configuration data, if any to the second virtual compute space.

A test period then begins at step 412 and continues until an end condition, such as an elapsed time or a volume of processed event messages, is reached. During the test period, the system at step 412 receives an event message associated with an event that triggers execution of the user code. In some embodiments, during the test only a subset, such as five percent, of the total volume of event messages received, may be routed to the second network-accessible services system so as not to overload the compute resources. Thus, at step 414 the system may check whether the subset is currently at its capacity of contained event messages. If so, at step 416 the system may route the event message back to the first virtual compute space for processing. If the subset is not full, at step 418 the system routes the event message to the second network-accessible services system for processing. For example, the system may include an event message routing service that executes program instruction to identify an event provider system in communication with the event message routing system, the event provider system transmitting the first request to the event message routing service. The event message routing service may generate a routing message comprising an instruction to transmit the first request to the second network-accessible services system, and may send the routing message to the event provider system. At step 420, the system checks whether the test end condition has been reached, and returns to step 412 if not. Once the test end condition is reached, the system proceeds out of the loop to step 422.

As the event messages are routed, the receiving network-accessible services systems are executing the user code to process the event messages. The execution may be monitored to collect performance data describing execution metrics such as latency, total execution time, cost, resource usage, and the like. At step 422, the system obtains the performance data describing some or all of the user code executions. For example, the system may query one or both network-accessible services systems to retrieve the performance data recorded by one or more services (e.g., a network and/or activity monitoring service, or a dedicated service that records data pertaining to execution of the user code) on each of the network-accessible services systems. At step 424, the system analyzes the performance data to determine whether any performance gain can be realized by executing the user code on the second network-accessible services system. For example, the system may determine a first performance metric from the network data and/or the performance data, the first performance metric associated with processing one or more of the plurality of event messages with the program code on the first network-accessible services system. The system may also determine a second performance metric from at least the performance data, the second performance metric associated with processing the first subset of event messages with the program code on the second network-accessible services system. The system may then compare the first performance metric to the second performance metric to produce a performance gain metric describing, relative to the first network-accessible services system, one or both of a faster processing time of the second network-accessible services system and a lower amount of resources used by the second network-accessible services system. Finally, the system may determine that the performance gain metric is greater than a threshold value stored in memory.

If the performance data shows that an overall performance gain would be realized (i.e., the user code is simply in the wrong computing environment), at step 426 the system may initiate migration of the user code deployment to the second computing environment. In some embodiments, the system may migrate the user code by modifying the event message generation for triggering events to deliver the event messages to the second computing environment. In another embodiment, the system's event message router service may remain in place to redirect all of the event messages. The system may remove the user code from the first computing environment to release compute resources. Alternatively, the system may generate an alert to the associated user that a migration would improve efficiency, and let the user make the changes.

Figure 5:
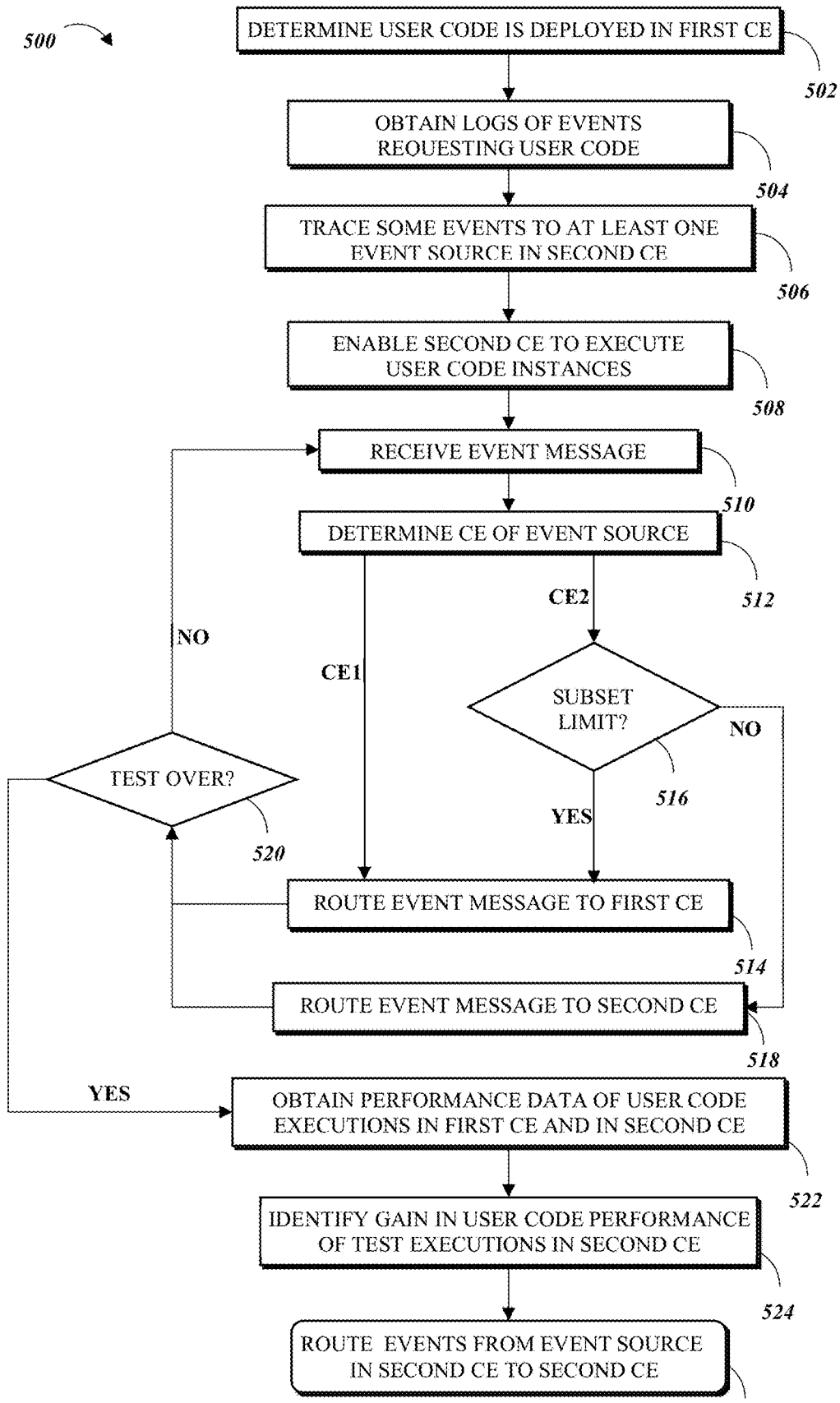
FIG. 5 is a flow diagram of another exemplary method for determining an optimal program code deployment and routing of event messages, in accordance with the present disclosure.

In some situations, efficient execution of the program code may be complicated because the triggering events, the program code's output data, and the program code itself may be located in different computing environments. Thus, where a program code is deployed in an Eastern U.S. region and sends output data to an endpoint in the Eastern U.S. region, but is triggered by events from an event source in the Western Europe region, it may be unclear which deployment is optimal. FIG. 5 depicts a method 500 implemented by the components of the user code deployment system, described above, to test whether migrating, from a first network-accessible services system where the user code is deployed to a second network-accessible services system, program code instances triggered by events from a particular event source that might produce a performance gain. At step 502, the system determines that the user code is deployed in the first computing environment, i.e., on or accessible by the first network-accessible services system over a first network within the first computing environment. At step 504, the system may obtain one or more historical logs documenting metadata of the events that have requested the user code. For example, the system may access a historical data store and retrieve the historical logs stored there, which logs may be obtained by a network usage monitoring service or another service that monitors execution of the user code. From these logs, at step 506 the system may determine that at least some of the events processed by the first network-accessible services system originate from an event source located within or approximate the second computing environment. Additionally or alternatively, the system may obtain network data describing the network activity of previous executed user code instances, and may identify an event source disposed in the second computing environment from such data.

At step 508, the system enables the second network-accessible services system to execute the user code, such as by copying the user code to the second network-accessible services system and otherwise deploying the user code on the second network-accessible services system as described above. A test period then begins at step 510 and continues until an end condition, such as an elapsed time or a volume of processed event messages, is reached. During the test period, the system at step 510 receives an event message associated with an event that triggers execution of the user code. At step 512 the system determines whether the event message is associated with an event that originated from the event source in the second computing environment. For example, the system may read from the event message metadata or other parameters, such as a source IP address, that identify the event and/or the event source, and may use the read information to identify the second network. If the event message is not associated with an event originating from the second computing environment, at step 514 the system routes the event message to the first computing environment. If so, at step 516 the system may check whether the subset is currently at its capacity of contained event messages. If so, at step 514 the system may route the event message back to the first virtual compute space for processing. If the subset is not full, at step 518 the system routes the event message to the second network-accessible services system for processing. At step 520, the system checks whether the test end condition has been reached, and returns to step 510 if not. Once the test end condition is reached, the system proceeds out of the loop to step 522.

As in the method 400, at step 522 the system obtains performance data describing some or all of the user code executions. At step 524, the system analyzes the performance data to determine whether any performance gain can be realized by executing the user code on the second network-accessible services system, when the execution is triggered by an event originating from the event source in the second computing environment. If the performance data shows that a performance gain would be realized, at step 526 the system may continue routing event messages associated with the event source to the second computing environment.

Figure 6:
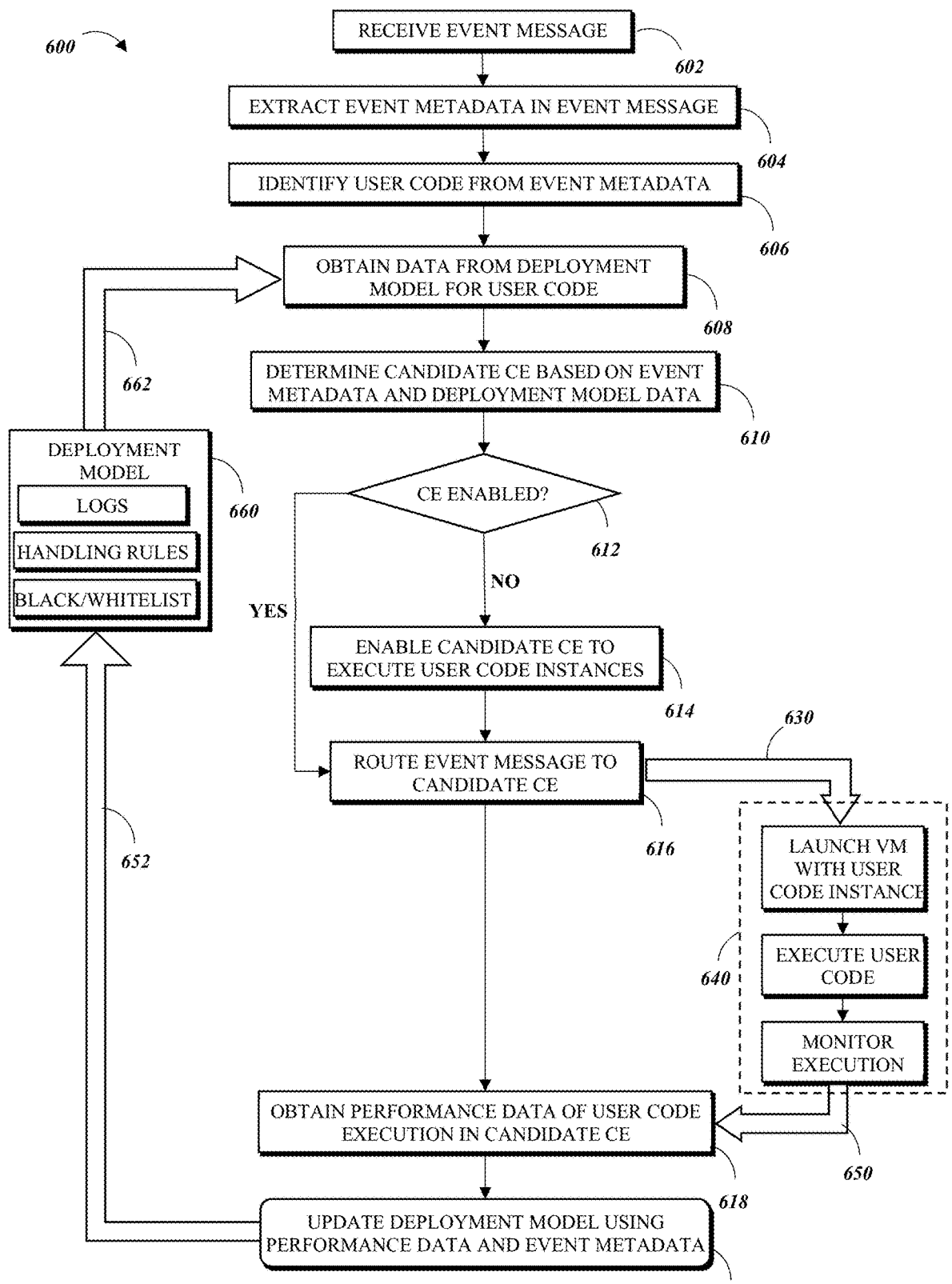
FIG. 6 is a flow diagram of yet another exemplary method for determining an optimal program code deployment and routing of event messages, in accordance with the present disclosure.

In still other situations, some of the resources to be accessed may not be identified by the user code until runtime. There may be no pattern to the network activity, or the pattern may not be readily discernible. FIG. 6 depicts a method 600 implemented by the components of the user code deployment system, described above, to develop and continually refine a deployment model that can suggest an optimal computing environment for deployment, based on all of the available data pertaining to a particular event message. At step 602, the system receives an event message for triggering the user code, as described above. At step 604, the system extracts metadata from the event message, such as by reading values in the event message that are associated with identifiable fields or parameters. The metadata may describe the event (e.g., event source, time of origination, identifiers of modified or essential resources), the event message (e.g., filename, permissions, sender, destination, input parameters for user code), other resources (filename, path, IP address), and the like.

At step 606, the system may identify which user code is being triggered using the metadata. Additional metadata about the event or request may be determined from other sources. For example, the system may parse the actual source code of the user code to determine if any parameters are present. At step 608, the system may access the deployment model 660 and obtain model data 662 that is relevant to the program code. The model data 662 may include programmatic event-handling information that describes proper handling learned by the deployment model 660 for event messages with similar metadata. However, there may not be a direct match of the metadata parameters to the programmatic event-handling information, so at step 610 the system uses both the model data and the identified metadata to determine a candidate computing environment.

At step 612, the system may check whether the candidate computing environment is enabled to execute the user code, and at step 614 may enable the candidate computing environment as described above. At step 616, the system may route the event message 630 to the network-accessible services system 640 of the candidate computing environment. The network-accessible services system 640 executes the user code and produces performance data 650, which the system obtains at step 618. At step 620, the system updates the deployment model 660 by sending a data package 652 containing the performance data and the identified metadata parameters for incorporation into the deployment model 660.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system for processing requests to execute a program code on a first network-accessible services system connected to a first communication network, the system comprising:
   an electronic data store configured to store network data describing usage, by the first network-accessible services system while executing the program code, of the first communication network and of a second communication network communicatively isolated from the first communication network; and
   a user code deployment system in communication with the electronic data store and comprising one or more hardware computing devices executing specific computer-executable instructions that upon execution cause the user code deployment system to:
      receive the network data from the electronic data store;
      identify, using the network data, a second network-accessible services system connected to the second communication network and able to execute the program code;
      send the program code to the second network-accessible services system;
      receive a plurality of event messages, each event message designated to trigger execution of the program code;
      send a first subset of the plurality of event messages to the second network-accessible services system, wherein the second network-accessible services system includes instructions that upon execution cause the program code to be executed in response to receiving each event message in the first subset;
      receive performance data describing execution on the second network-accessible services system of the program code to process the first subset of event messages;
      determine a first performance metric from at least the network data, the first performance metric associated with processing one or more of the plurality of event messages with the program code on the first network-accessible services system;
      determine a second performance metric from at least the performance data, the second performance metric associated with processing the first subset of event messages with the program code on the second network-accessible services system;
      compare the first performance metric to the second performance metric to produce a performance gain metric describing, relative to the first network-accessible services system, one or both of a faster processing time of the second network-accessible services system and a lower amount of resources used by the second network-accessible services system;
      determine that the performance gain metric is greater than a threshold value; and
      route to the second network-accessible services system at least a portion of a plurality of subsequently received event messages representing the requests.

2. The system of claim 1, wherein the user code deployment system further includes instructions that upon execution cause the user code deployment system to:
   send a second subset of the plurality of event messages to a first request processing unit of the first network-accessible services system, the first network-accessible services system executing the program code in response to receiving each of the second subset of event messages, the performance data further describing execution by the first network-accessible services system of the program code to process the second subset of event messages;
   determine a third performance metric from at least the performance data, the third performance metric associated with processing the second subset of event messages with the program code on the first network-accessible services system;
   further compare the second performance metric to the third performance metric to produce the performance gain metric; and
   responsive to determining that the performance gain metric is greater than the threshold value, route all of the plurality of subsequently received event messages to the second network-accessible services system.

3. The system of claim 1, wherein each event message of the first subset of event messages is associated with an event source connected to the second communication network, and wherein the user code deployment system further includes instructions that upon execution cause the user code deployment system to:
   send a second subset of the plurality of event messages to a first request processing unit of the first network-accessible services system, the first network-accessible services system executing the program code in response to receiving each of the second subset of event messages, each event message of the second subset of event messages being associated with the event source, the performance data further describing execution by the first network-accessible services system of the program code to process the second subset of event messages;
   determine a third performance metric from at least the performance data, the third performance metric associated with processing the second subset of event messages with the program code on the first network-accessible services system;
   to produce the performance metric, further compare the third performance metric to the second performance metric; and
   responsive to determining that the performance gain metric is greater than the threshold value, route each of the plurality of subsequently received event messages that is associated with the event source to the second network-accessible services system.

4. The system of claim 1, wherein the electronic data store stores a deployment model for the program code, the deployment model containing programmatic event-handling information, and wherein the user code deployment system further includes instructions that upon execution cause the user code deployment system to:
   identify metadata of one or more of the plurality of event messages, the metadata describing one or more of an event source, an input parameter for the program code, a remote resource to be accessed by the program code, and an internal resource of the first network-accessible services system;

to identify the second network-accessible services system:
  access the deployment model; and
  use the programmatic event-handling information to determine a correlation between the metadata and the second communication network; and after receiving the performance data, access the deployment model and update the programmatic event-handling information to include the performance data.

5. A system, comprising an event message routing service comprising one or more hardware computing devices executing specific computer-executable instructions that upon execution cause the event message routing service to at least:

receive a first request requesting execution of a program code of a user on a first network-accessible services system associated with a first geographic region, wherein the first network-accessible services system manages execution of the program code by a first pool of virtual machine instances in the first geographic region, the first network-accessible services system configured to allocate compute resources of the first network-accessible services system for executing a first instance of the program code to process a first event associated with the first request;

determine, based at least on first data describing one or more executions of the program code on the first network-accessible services system, that at least one of the one or more executions of the program code uses a first computing resource via a communication network associated with a second network-accessible services system associated with a second geographic region, wherein the second network-accessible services system manages execution of programs by a second pool of virtual machine instances in the second geographic region;

determine, based at least on the first data describing one or more executions of the program code on the first network-accessible services system associated with the first geographic region, a first performance metric associated with processing one or more of a plurality of event messages with the program code on the first network-accessible services system associated with the first geographic region;

determine, based at least on second data describing one or more executions of the program code on the second network-accessible services system associated with the second geographic region, a second performance metric associated with processing one or more of the plurality of event messages with the program code on the second network-accessible services system associated with the second geographic region;

compare the first performance metric and the second performance metric to determine that one or more performance characteristics of the program code are improved by executing the program code on the second network-accessible services system associated with the second geographic region rather than the first network-accessible services system associated with the first geographic region; and based on determining that one or more performance characteristics of the program code are improved by executing the program code on the second network-accessible services system associated with the second geographic region rather than the first network-accessible services system associated with the first geographic region, reroute the first request, requesting execution of the program code of the user on the first network-accessible services system associated with the first geographic region, to the second network-accessible services system associated with the second geographic region.

6. The system of claim 5, wherein the event message routing service further includes instructions that upon execution cause the event message routing service to enable the second network-accessible services system to execute the program code in response to the first request.

7. The system of claim 6, wherein to enable the second network-accessible services system, the event message routing service further includes instructions that upon execution cause the event message routing service to route a copy of the program code together with the first request to the second network-accessible services system.

8. The system of claim 5, wherein the first network-accessible services system is communicatively isolated from the communication network and the second network-accessible services system, and wherein the second network-accessible services system is connected to the communication network, the event message routing service further including instructions that upon execution cause the event message routing service to route the first request within a predetermined time after receiving the request, such that routing the first request to the second network-accessible services system improves a speed of processing the request.

9. The system of claim 8, wherein to route the first request to the second network-accessible services system, the event message routing service further includes instructions that upon execution cause the event message routing service to:
  identify an event provider system in communication with the event message routing system, the event provider system transmitting the first request to the event message routing service;
  generate a routing message comprising an instruction to transmit the first request to the second network-accessible services system; and
  send the routing message to the event provider system.

10. The system of claim 8, wherein to route the first request to the second network-accessible services system, the event message routing service further includes instructions that upon execution cause the event message routing service to:
  identify an event provider system in communication with the event message routing system, the event provider system transmitting the first request to the event message routing service;
  generate a routing message comprising an alert to configure the event provider system to send a plurality of subsequent requests to execute the program code to the second network-accessible services system; and
  send the routing message to a user device via a user interface that displays the alert on the user device.

11. The system of claim 8, wherein the event message routing service is implemented in the first network-accessible services system, the system further comprising a computing environment interface, the event message routing service further including instructions that upon execution cause the event message routing service to route the first request to the second network-accessible services system using the computing environment interface.

12. The system of claim 5, wherein the event message routing service further includes instructions that upon execution cause the event message routing service to:
- receive a plurality of event messages each associated with a corresponding request of a plurality of requests to execute the program code on the first network-accessible services system, the first request being included in the plurality of requests and being associated with a first event message of the plurality of event messages;
- route the plurality of event messages to the second network-accessible services system, wherein routing the first event message routes the first request;
- receive second data describing the executions of a plurality of instances of the program code on the second network-accessible services system in response to the plurality of event messages;
- determine from the second data a first request processing speed of the program code when the program code is executed on the second network-accessible services system;
- compare the first request processing speed to a second processing speed of the program code when the program code is executed on the first network-accessible services system to determine an improvement in an overall processing speed of the system processing requests; and
- responsive to determining the improvement in request processing speed, route all subsequent requests to execute the program code to the second network-accessible services system.

13. The system of claim 5, wherein the event message routing service further includes instructions that upon execution cause the event message routing service to:
- receive a first plurality of event messages each associated with a corresponding request of a first plurality of requests to execute the program code on the first network-accessible services system, the first request being included in the first plurality of requests and being associated with a first event message of the first plurality of event messages;
- receive a second plurality of event messages each associated with a corresponding request of a second plurality of requests to execute the program code on the first network-accessible services system;
- determine, based on one or both of network activity data and metadata of the first plurality of event messages, that processing the first plurality of event messages requires communicating over the communication network associated with the second network-accessible services system;
- determine, based on one or both of the network activity data and metadata of the second plurality of event messages, that processing the second plurality of event messages does not comprise communicating over the communication network associated with the second network-accessible services system;
- route the first plurality of event messages to the second network-accessible services system, wherein routing the first event message routes the first request; and
- route the second plurality of event messages to the first network-accessible services system.

14. The system of claim 5, further comprising a deployment model for the program code, the deployment model containing programmatic event-handling information, the event message routing system further including instructions that upon execution cause the event message routing service to:
- identify metadata of one or both of the request and an event associated with the request, the metadata describing one or more of an event source, an input parameter for the program code, and a remote resource to be accessed by the program code; and
- to determine that the program code uses the communication network, use the programmatic event-handling information to produce a correlation between the metadata and the communication network.

15. A method, comprising:
- receiving, at an event message routing service comprising one or more hardware computing devices executing specific computer-executable instructions, a first request requesting execution of a program code of a user on a first network-accessible services system associated with a first geographic region configured to asynchronously execute each of a plurality of first instances of the program code in the first geographic region;
- determining, based on first data describing one or more executions of the program code on the first network-accessible services system, that one or more of the plurality of first instances will use a communication network associated with a second network-accessible services system that is associated with a second geographic region and is communicatively isolated from the first network-accessible services system when executing, the second network-accessible services system being configured to asynchronously execute each of a plurality of second instances of the program code in the second geographic region;
- determining, based at least on the first data describing one or more executions of the program code on the first network-accessible services system associated with the first geographic region, a first performance metric associated with processing one or more of a plurality of event messages with the program code on the first network-accessible services system associated with the first geographic region;
- determining, based at least on second data describing one or more executions of the program code on the second network-accessible services system associated with the second geographic region, a second performance metric associated with processing one or more of the plurality of event messages with the program code on the second network-accessible services system associated with the second geographic region;
- comparing the first performance metric and the second performance metric to determine that one or more performance characteristics of the program code are improved by executing the program code on the second network-accessible services system associated with the second geographic region rather than the first network-accessible services system associated with the first geographic region; and
- based on determining that one or more performance characteristics of the program code are improved by executing the program code on the second network-accessible services system associated with the second geographic region rather than the first network-accessible services system associated with the first geographic region, rerouting the first request, requesting execution of the program code of the user on the first network-accessible services system associated with the first geographic region, to the second network-accessible services system associated with the second geographic region.

16. The method of claim 15, further comprising:
- receiving a plurality of event messages each associated with a corresponding request of a plurality of requests to execute the program code on the first network-accessible services system, the first request being included in the plurality of requests and being associated with a first event message of the plurality of event messages;
- routing the plurality of event messages to the second network-accessible services system;
- receiving second data describing the executions of the plurality of second instances of the program code on the second network-accessible services system in response to the plurality of event messages;
- comparing the first data and the second data to determine an improvement, relative to executing the program code on the first network-accessible services system, in request processing speed when the program code is executed on the second network-accessible services system; and
- responsive to determining the improvement in request processing speed, routing all subsequent requests to execute the program code to the second network-accessible services system.

17. The method of claim 15, further comprising:
- receiving a first plurality of event messages each associated with a corresponding request of a first plurality of requests to execute the program code on the first network-accessible services system, the first request being included in the first plurality of requests and being associated with a first event message of the first plurality of event messages;
- receiving a second plurality of event messages each associated with a corresponding request of a second plurality of requests to execute the program code on the first network-accessible services system;
- determining, based on one or both of network activity data and metadata of the first plurality of event messages, that receiving and processing the first plurality of event messages requires communicating over the communication network associated with the second network-accessible service;
- determining, based on one or both of the network activity data and metadata of the second plurality of event messages, that processing the second plurality of event messages does not comprise communicating over the communication network associated with the second network-accessible service;
- routing the first plurality of event messages to the second network-accessible services system; and
- routing the second plurality of event messages to the first network-accessible services system.

18. The method of claim 15, further comprising
- accessing a deployment model for the program code, the deployment model containing programmatic event-handling information;
- identifying metadata of one or both of the request and an event associated with the request, the metadata describing one or more of an event source, an input parameter for the program code, and a remote resource to be accessed by the program code; and
- using the programmatic event-handling information to produce a correlation between the metadata and the communication network associated with the second network-accessible service.

19. The method of claim 15, wherein the first network-accessible services system is communicatively isolated from the communication network associated with the second network-accessible service and the second network-accessible services system, and wherein the second network-accessible services system is connected to the communication network associated with the second network-accessible service, the method further comprising routing the first request within a predetermined time after receiving the first request, such that routing the first request to the second network-accessible services system improves a speed of processing the request.

20. The method of claim 15, wherein rerouting the first request to the second network-accessible services system comprises:
- identifying an event provider system from which the first request is received;
- generating a routing message comprising an instruction to transmit the first request to the second network-accessible services system; and
- sending the routing message to the event provider system.

* * * * *